(12) United States Patent
Lohr et al.

(10) Patent No.: US 7,770,471 B2
(45) Date of Patent: *Aug. 10, 2010

(54) TORQUE MEASUREMENT WITHIN A POWERTRAIN

(75) Inventors: Raymond David Lohr, Buckinghamshire (GB); Mark Lee, Southampton (GB); Arthur John Leigh, Oxfordshire (GB); David Daniel George Vile, Oxfordshire (GB); Paul Joseph Howse, Oxfordshire (GB)

(73) Assignee: Transense Technologies PLC (GB)

( * ) Notice: Subject to any disclaimer, the term of this patent is extended or adjusted under 35 U.S.C. 154(b) by 101 days.

This patent is subject to a terminal disclaimer.

(21) Appl. No.: 11/939,242

(22) Filed: Nov. 13, 2007

(65) Prior Publication Data

US 2009/0013803 A1 Jan. 15, 2009

Related U.S. Application Data

(63) Continuation-in-part of application No. PCT/GB2005/003118, filed on Aug. 8, 2005.

(30) Foreign Application Priority Data

Aug. 16, 2004 (GB) ................................ 0418271.3
Mar. 15, 2006 (GB) ................................ 0605240.1
Mar. 9, 2007 (WO) ............... PCT/GB2007/000824

(51) Int. Cl.
*G01L 1/22* (2006.01)
(52) U.S. Cl. .................................... 73/862.338; 73/760
(58) Field of Classification Search ..............................
73/862.041–862.046, 760–860, 862.331–862.339
See application file for complete search history.

(56) References Cited

U.S. PATENT DOCUMENTS

| 4,135,390 | A | 1/1979 | Templin |
| 5,975,136 | A | 11/1999 | Heitzer |
| 6,269,702 | B1 * | 8/2001 | Lambson ............... 73/862.045 |
| 7,111,611 | B1 * | 9/2006 | Lyon .......................... 123/399 |
| 7,389,682 | B2 * | 6/2008 | JaVaherian ............... 73/117.02 |
| 7,520,179 | B2 * | 4/2009 | Bernstein et al. .............. 73/801 |
| 2003/0000309 | A1 | 1/2003 | Lonsdale et al. |
| 2009/0314104 | A1 * | 12/2009 | Lohr et al. ............. 73/862.338 |

FOREIGN PATENT DOCUMENTS

| DE | 4208522 A1 | 9/1993 |
| EP | 1353159 A2 | 10/2003 |
| GB | 2381069 A | 4/2003 |
| GB | 2417322 A | 2/2006 |
| WO | WO2004106877 A1 | 12/2004 |
| WO | WO2005075950 A1 | 8/2005 |

* cited by examiner

*Primary Examiner*—Max Noori
(74) *Attorney, Agent, or Firm*—Keusey & Associates, P.C.

(57) ABSTRACT

A method is provided for measuring torque in a shaft of a drive line including a disc coupling component such as a flexplate 1 or a flanged coupling 13, as well as a drive coupling system for carrying out the method. The disc coupling component 1, 13 is connected between a drive input 4 and a drive output so that all torque transmitted between the input and output passes through said component. The disc coupling component 1, 13 has a radially extending portion, which may include a plurality of spokes 7, to which is attached a SAW based strain sensor which communicates with a stationary coupler 3 fastened to an engine block 5 for wireless transmission of data from the sensor, the strain sensor measuring the strain in the disc coupling component 1, 13 from which the torque carried in the input shaft 4 may be calculated.

24 Claims, 6 Drawing Sheets

TORQUE MEASUREMENT WITHIN A POWERTRAIN

CROSS-REFERENCE TO RELATED APPLICATIONS

This application is a Continuation-in-Part of International Application PCT/GB2005/003118 filed on Aug. 8, 2005 which claims priority from GB Application 0418271.3 filed on Aug. 16, 2004 and International Application PCT/GB2007/000824 filed on Mar. 9, 2007 which claims priority from GB Application 0605240.1 filed on Mar. 15, 2006.

BACKGROUND OF THE INVENTION

1. Field of the Invention

The present invention relates to methods of measuring torque within a powertrain as well as to apparatus for carrying out such methods, and more particularly to such an assembly incorporating a sensor for measuring torque transmitted through the coupling plate.

2. Prior Art

Modern internal combustion engines for automobiles, utilise engine management systems which rely on dynamometer derived data for torque output as measured on a relatively small number of test engines. This approach cannot account for the variance in performance of volume produced engines, either across the range of production tolerances or over service life, and is therefore sub-optimal.

Engine torque output is dependent on a number of variables including: rpm, ignition advance, airflow, fuel flow, barometric pressure and ambient temperature. In a modern vehicle, some or all of these variables are measured continuously and used in conjunction with a multi-dimensional memory map stored in the engine control unit (ECU) in order to predict torque. Actual engine output torque is controlled by varying air flow, fuel flow and ignition advance in response to driver demand, i.e. the position of the accelerator pedal, and in accordance with ambient temperature and pressure conditions. Engine management maps may be determined in order to minimise fuel consumption and/or emissions or, for example in a racing car, to maximise torque and/or power.

In principle an internal combustion engine can be thought of as a "torque pump". Within the discipline of control engineering, it is generally recognised that one of the most effective and accurate ways in which to control the output of a device is to directly measure the output variable of interest and use it as a real-time negative feedback signal in a closed loop control system. Since the principal output of an automotive internal combustion engine is torque, then a torque sensor placed as close as possible to the engine output, i.e. the rear end of the crankshaft, offers the ideal route to improved engine control.

A further benefit of accurate real time torque measurement is in the control of automatic transmissions since, if gear ratio changes are carried out at zero torque or other controlled torque values, improvements can be made in gear change smoothness or speed. The ability to measure torque directly at the engine output can lead to a significant step forward in this application.

Historically, direct measurement of torque in a powertrain has been primarily restricted to engine research and development using techniques such as:

a brake dynamometer to measure engine or engine+transmission torque outputs. This approach effectively averages the torque output over a time period dependent on the bandwidth of the instrumentation. However, because of rotary inertias distributed throughout the powertrain, this technique cannot yield the instantaneous torque output of the engine at the crankshaft output.

strain gauged torque cells are used routinely in R&D applications. However they are far too expensive for use in customer vehicles. They also require slip ring systems to transmit power and signals between the rotating powertrain and the stationary chassis or rig.

magneto-elastic torque sensors have been applied to test vehicles and some racing vehicles. They are applicable to shaft mounting and require typically 20-50 mm of shaft length for their installation. Such space is at a premium in production powertrains and may be unavailable in systems incorporating automatic transmissions. In addition magneto-elastic sensors are susceptible to stray magnetic fields which abound in production vehicles due to multiple electric motors and solenoids.

In an automatic transmission equipped automotive powertrain, the engine output is transferred from a bolted flange at the end of the crankshaft, via a flexible steel disk (flexplate), to the torque converter by a second group of bolted fastenings (typically 3 or 4) on a significantly larger radius. The flexplate also carries the starter ring gear around its periphery.

Torque generated by the engine is transmitted by developing shear strain within the disk material, which in principal can be sensed by applying at least one pair of linear strain transducers oriented at +/−45' to a line radiating from the centre of the flexplate. This approach to torque measurement in an essentially rigid disk component is understandable to those skilled in the art of transducer design and disclosed in DE 4208522. However, a flexible disk coupling component such as a flexplate, in its normal duty, is potentially subject to three forces and two couples apart from the desired couple (i.e. in-plane torque), and these extraneous loads can reduce the accuracy of the torque measured using a strain sensor mounted on the disk.

The problem of measuring torque in a flexplate (a standard automotive component which transfers torque from the crankshaft to the torque converter) is that the flexplate must be flexible (compliant) with regard to axial loading and to out-of-plane bending but stiff in torsion. The axial loading can be due to axial movement or expansion (due to internal pressure) of the torque converter, whereas the out-of-plane bending can be caused by any angular misalignment between the crankshaft axis and the automatic transmission axis. Flexplate compliance means that high stresses, due to axial loading and out-of-plane bending, which might lead to vibration within the vehicle and fatigue failure of the flexplate, are prevented. The successful design of a torque sensing flexplate hinges on the ability to be able to minimise and separate the unwanted strains due to axial loading and out-of-plane bending from the wanted strains due to engine torque. The prior art has not been able to achieve this goal.

There are numerous examples of sensors for measuring the torque or twist in a shaft with the purpose of monitoring its safe operation or to effect control of some upstream or downstream piece of equipment, for example in an engine or a driven wheel. Indeed it is recognised within the automotive industry, that sensing torque is theoretically one of the best ways for effecting control of internal combustion engines and for torque distribution within all-wheel-drive systems. However the reliable and cost effective provision of such torque sensors in automotive applications has thus far been problematic. For example, in an automotive crankshaft or gearbox output shaft, there is typically either no available physical space on the shaft in which to locate such a torque sensor or the strain field is inappropriate—either too low in strain or too high in strain gradient.

Prior art systems are known, such as that illustrated in FIG. 3 of the present application, in which torque in a shaft is monitored by measuring the strain, in particular the bending strain arising on the circumferential faces (at either end of the internal faces) of spokes through which the torque in the shaft is transmitted.

SUMMARY OF THE INVENTION

According to the present invention there is provided a method of measuring torque in a shaft of a drive line including a disc coupling component, the method comprising measuring the shear strain field on an axial surface of the disc coupling component and calculating the torque in the shaft using said strain measurements The present invention further provides a drive coupling system comprising at least one shaft drivingly coupled to a disc coupling component for transmitting drive from said shaft, and at least one strain sensor mounted on an axial surface of the disc coupling component for measuring the shear strain field on said disc coupling component.

Reference above and hereinafter to an axial surface means a surface which is perpendicular to the shaft axis.

More particularly, in the present invention, torque is measured within a power train by the measurement of the principal strains due to shear directly on the surface of flanged, disc or webbed sections of existing Powertrain components by using sensing elements placed on a surface perpendicular to the shaft axis. Typically the components are shaft input/output flanged couplings, flexplates or indeed any component that provides a web or disc surface that transmits torque through the powertrain.

The present invention derives from the recognition that the principal components of shear strain arising in a disc coupling component in a drive train are analogous to the strain field developed on the surface of the shaft in torsion, i.e. the principal strains are equal and opposite, tensile and compressive, and oriented at +/−45° to the circumferential direction in the disc component. As a result the greater space available on the disc coupling components, such as the flexplate which is used to connect a crankshaft to a torque converter in a typical powertrain with an automatic transmission, the web of a flanged coupling located, for example, between the gearbox output and the prop shaft, can be used to mount a strain sensor which, due to size constraints, cannot be located directly on the shaft. This has the advantage of requiring little or no change to the leading dimensions of major components whilst enabling monitoring of the full torque transmitted between those components.

Preferably, the strain sensor is a wireless sensor, in particular a SAW sensor, and it is particularly advantageous to use a SAW sensor having 2 active elements at different orientations so as to enable both principal strains to be monitored by a single sensor.

The sensor is preferably located on a web portion of disc coupling component through which torque between the input and output is transmitted. This web portion may be suitably sized and shaped to concentrate the torsional (shear) strain and hence improve the resolution and accuracy of measurement.

A further aspect of the present invention provides a drive coupling system comprising at least one shaft drivingly coupled to a flexible disc coupling component for transmitting drive from the shaft, the disc coupling component having a plurality of circumferentially distributed axial through-apertures formed therein so as to define, between each pair of adjacent apertures, a radially extending web, a plurality of circumferentially distributed axial fastening holes extending through the disc coupling component for drivingly attaching it to an output member, and a strain sensor or plurality of strain sensors for measuring the shear strain field on said disc coupling component, wherein each said strain sensor is mounted in a countersunk recess formed in an axial surface of one of the webs such that each (the) sensor lies at least proximate to the local neutral axis of the disc coupling component.

Such a drive coupling system has the advantage that locating of the or each sensor on the local neutral axis of the disc coupling component minimises superimposed bending strains due to couples acting out-of-plane on the coupling component.

Preferably, a plurality of circumferentially extending slots are formed in the disc coupling component between each fastening hole and the outer edge of the disc coupling component. The ligaments, formed between these circumferentially extending slots and the adjacent apertures, are essentially flexures which absorb to a significant extent the deflection due to unwanted axial loading and out-of-plane bending and adjust the axial compliance of the coupling component, which thereby increases the measuring accuracy of the sensor.

Several techniques are involved in providing accurate measurement of torque and rejection of unwanted signals, while maintaining the original design axial compliance, and non contacting sensing capability:

1) The distribution of holes on the drive coupling plate, designed to achieve a certain level of axial compliance, is modified so as to generate a small number (typically 3 or 4) of webs to concentrate the shear strain.

2) The active surface of the measuring sensors are placed on the local neutral axis of the drive coupling plate, thereby minimising superimposed bending strains due to couples acting out-of-plane on the drive coupling plate.

3) The measurement sensor or sensors are placed symmetrically on the web(s) so as to minimise strains due to twisting—again due to couples acting out-of-plane on the drive coupling plate.

4) Decoupling slots are introduced between the torque converter fastening holes and the starter ring in order to create relatively compliant flexures which absorb, to a significant extent, the deflections due to axial loading and out-of-plane couples bending and adjust the axial compliance.

5) The thickness of the drive coupling plate may be increased, and the web widths reduced, in order to reduce bending strains (maximised at the surface) while maintaining the desired shear strain (distributed through the thickness) and to physically separate these strain components and to adjust the axial compliance.

6) The flatness of the drive coupling plate is improved to minimise strains due to clamping the drive coupling plate to the crankshaft flange.

7) the thickness tolerance is reduced to minimise production variation in the sensitivity of the drive coupling plate which is now essentially a transducer body.

8) The material is re-specified to ensure a sufficiently high elastic limit so the sensor performance is linear and does not exhibit hysteresis.

9) The torque transducers employed are surface acoustic wave (SAW) devices, which communicate in a non contacting manner (not requiring slip rings) and not requiring active electronic components on the drive coupling plate (no separate power supply).

Preferably, three or four through apertures are provided which correspondingly form three or four radial webs. In a particularly preferred embodiment, the through-apertures and fastening holes are equi-spaced on a common pcd.

Preferably, the or each strain sensor is a surface acoustic wave (SAW) device, which communicates in a non-contacting manner and which does not require active electronic components on the coupling component.

The or each sensor is preferably symmetrically located on its associated web, in particular on the radial centre line thereof. In this way, non-symmetrical effects, such as strains due to twisting resulting from couples acting out of plane on the coupling component are her minimised.

The webs are also preferably narrow so as to further decouple sensor output from deflections caused by unwanted forces and moments.

Advantageously, each aperture comprises a pair of wings which are symmetrical about a radial centre line of the aperture. The apertures are furthermore preferably symmetrically distributed around the coupling component, as are the fastening holes.

BRIEF DESCRIPTION OF THE DRAWINGS

In order that the invention may be well understood, there will now be described some embodiments thereof given by way of example, reference being made to the accompanying drawings, in which:

FIG. 1b is a cross-sectional view through the flexplate of FIG. 1a.

DETAILED DESCRIPTION OF THE PREFERRED EMBODIMENT

Figure 1A:
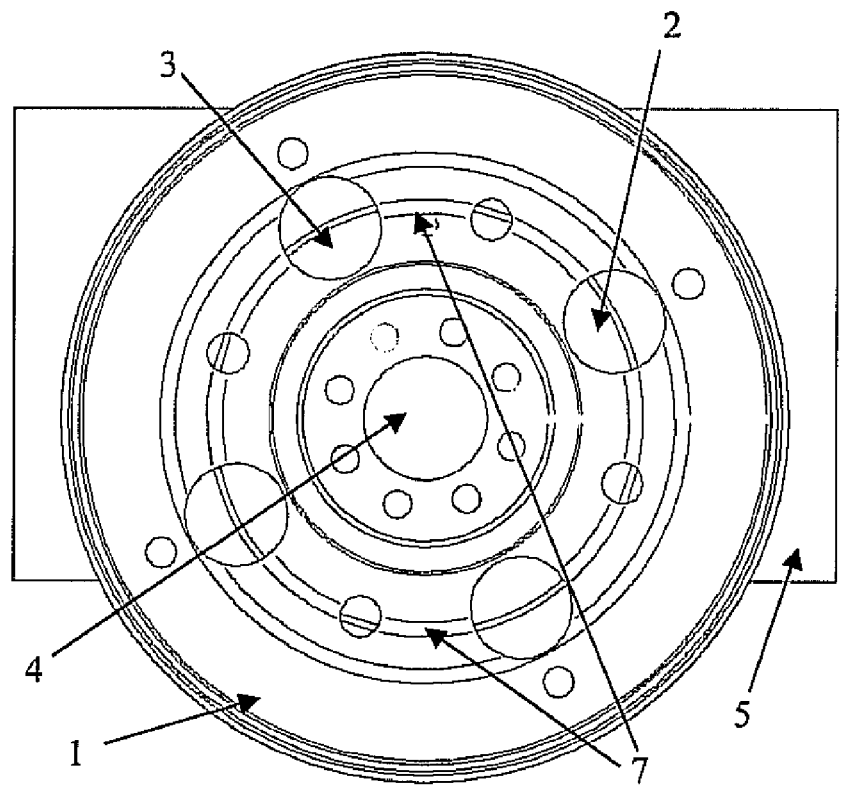
FIG. 1a is a front view of a flexplate which may be used in conjunction with the present invention to measure torque in a shaft of a drive train.
Figure 1B:
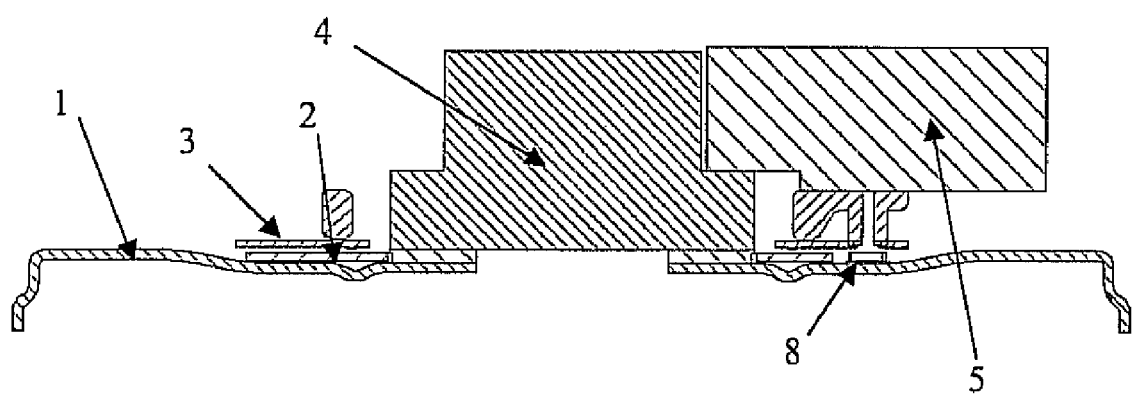

Referring to FIG. 1a, there is shown a flexplate 1, essentially a diaphragm which connects the crankshaft and the torque converter in a typical powertrain with automatic transmission, which is mounted on a crankshaft 4 which extends through an engine block 5. The flexplate is configured with cutouts to provide the required flexibility, forming spokes 7 therebetween, and, as shown in FIG. 1b, in the illustrated example a SAW sensor 8 is fastened to the engine block side of one of the spokes 7 for measuring the local strain field on the surface of the spoke, which is in turn proportional to the torque within the crank shaft 4. Also attached on the engine side of the flexplate 1 is a rotating coupler 2 which rotates with the flexplate and communicates with a stationary coupler 3 fastened to the engine block 5 for wireless transmission of signals from the SAW sensor. The stationary coupler, in the illustrated embodiment, is fastened to the block so as to maintain a small but consistent axial gap to the rotating coupler.

Figure 2:
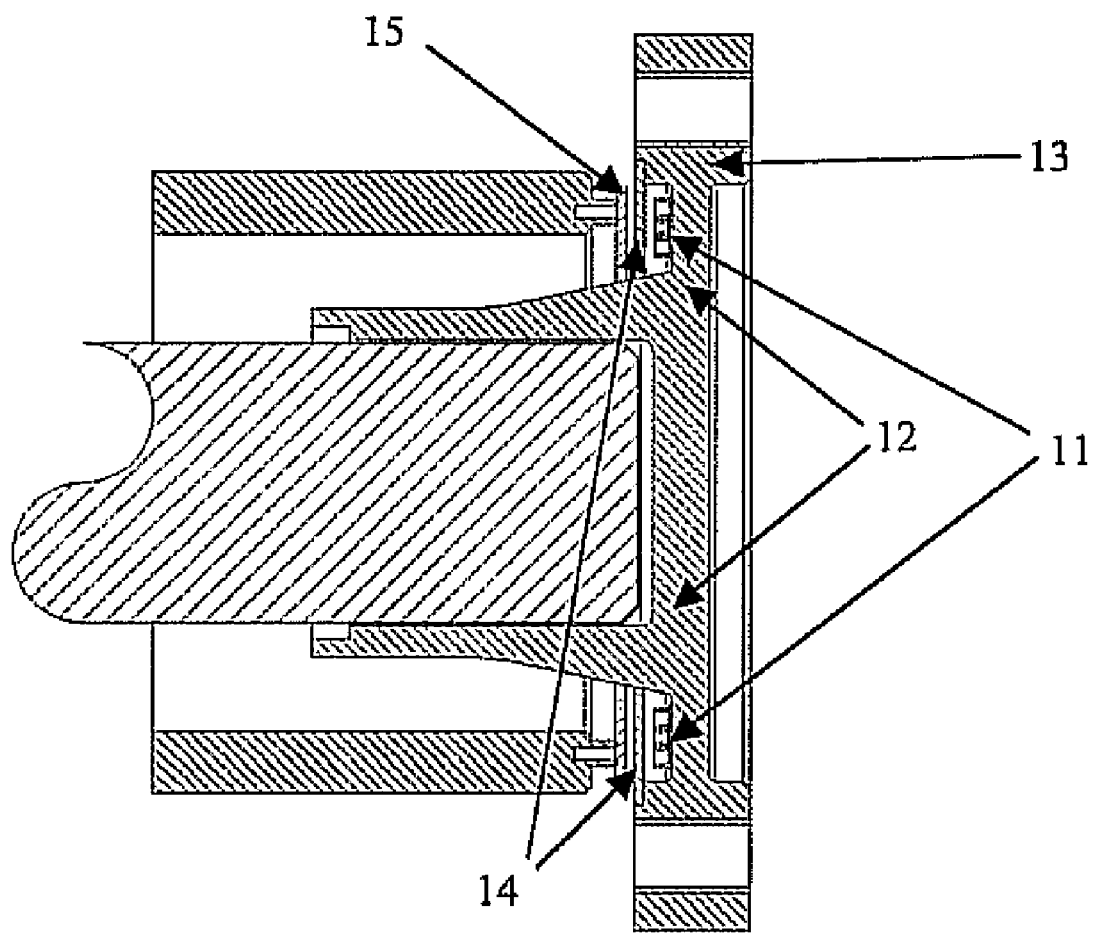
FIG. 2 is a cross-sectional view through a flanged coupling which may be used in conjunction with the present invention.
Figure 3:
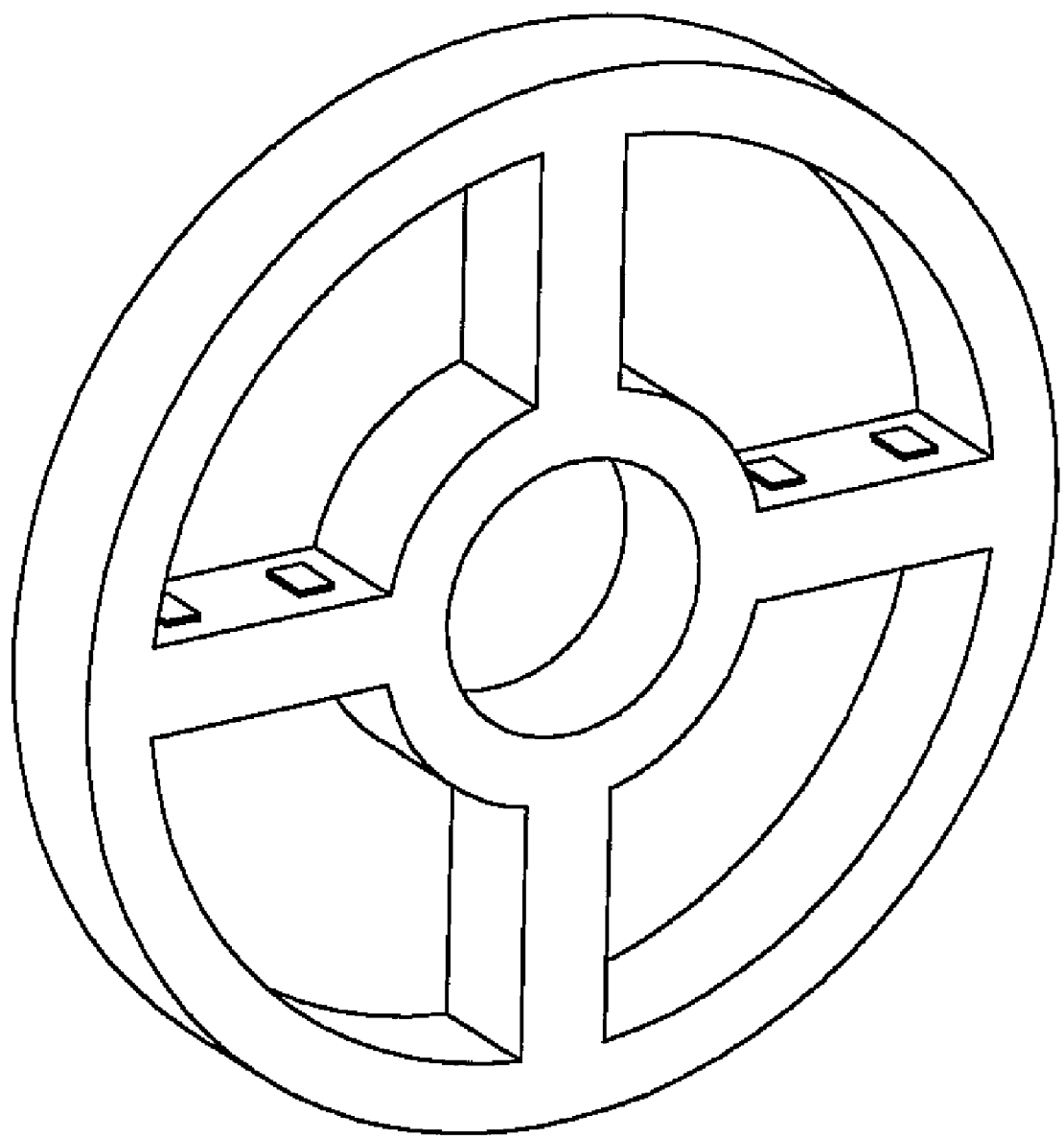
FIG. 3 is a cross-sectional view of a prior art arrangement.

In a second embodiment shown in FIG. 2, a SAW sensor 11 is mounted on a radial web 12 formed on a flanged coupling 13 such as that provided between the gearbox output and the propeller shaft of an engine. The web extends between the input and output connects of the coupling so that all torque transmitted therethrough passes through the web 12. In this way, the strain field within the web can be used accurately to mirror the torque within the shaft to which the coupling is attached. A rotating RF coupling 14 is fastened to the flanged plate 13 for rotation therewith and is electrically coupled to the SAW sensors 11. A static RF coupling 15 is then mounted in juxtaposition with the rotating coupling 14 for receiving signals from the latter in the form of the output from the sensors.

The above location for strain sensing, when coupled with the non-contacting wireless SAW technology of Transense, provides a unique and cost effective solution to a challenge that has faced the automotive world for many years.

Figure 4:
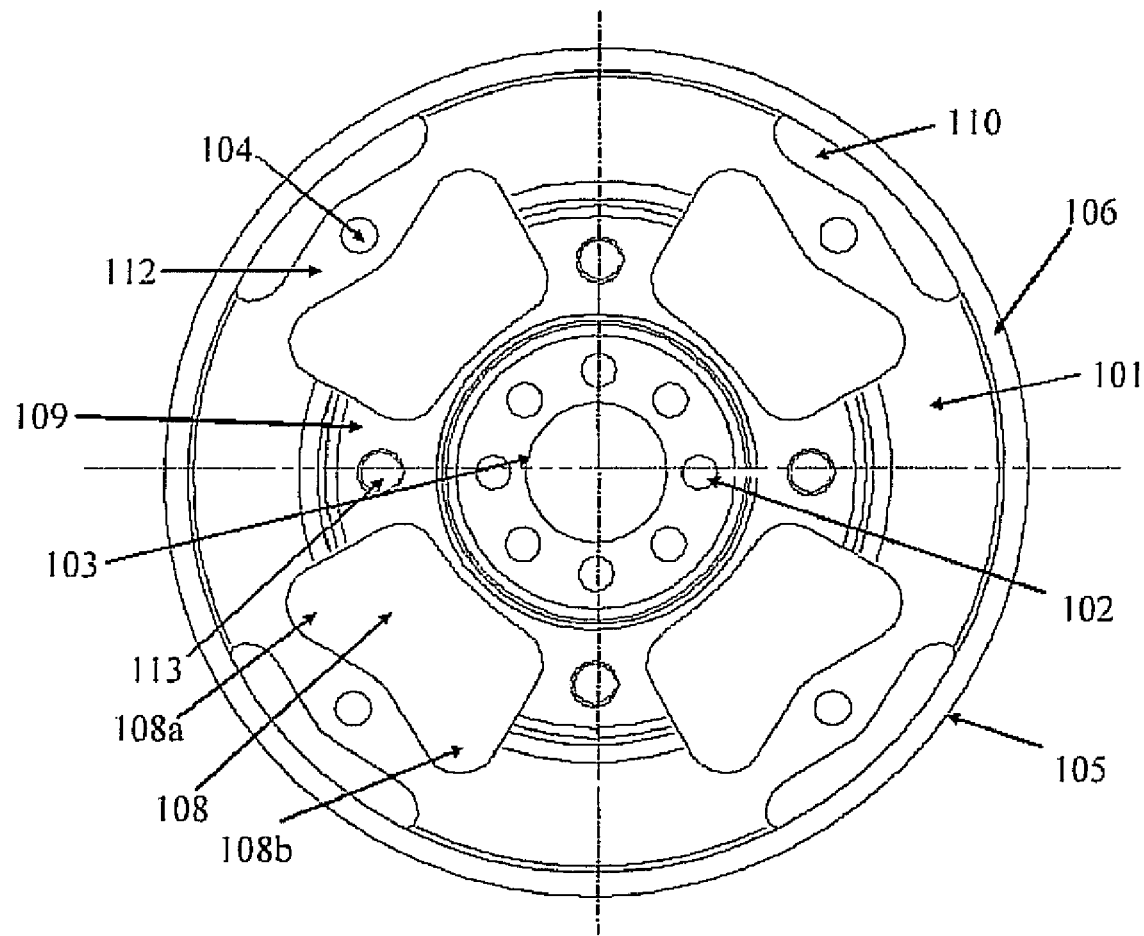
FIG. 4 is a front view of a first flexplate configuration embodying the invention.

Referring first to FIG. 4, there is shown a flexplate 101 which forms part of a drive coupling assembly. The flexplate 101 is an annular member having a first plurality of fastening holes 102, distributed around a first inner radius proximate to the inner circumferential edge 103 of the plate, for drivingly coupling the flexplate 101 to a flange coupling on an end of the crankshaft (not shown). A second set of four fastening holes 104 is distributed around a second radius proximate to the outer circumferential edge 105 of the flexplate 101, and a starter ring gear 106 is formed on the outer circumferential edge 105 of the flexplate 101, with which, in use, a gear of a starter motor (not shown) meshes for rotating the crank shaft.

The flexplate 101 further includes a plurality of through apertures 108—in the illustrated embodiment four, which are equi-angularly distributed around the flexplate on a common radius intermediate the first and second radii, and which are separated by four radially extending webs 109. Each aperture 108 has reflectional symmetry about a centre line which extends along a radius of the flexplate 101 and is butterfly shaped with a wing 108a, 108b extending on either side of the centre line. Each of the second set of four fastening holes 104 is associated with one of the apertures 108, lying on the radius of the flexplate 101 extending along the centre line of the associated aperture 108. A circumferentially extending through slot 110 is formed in the flexplate 101 radially outward of each aperture 108 and its associated second fastening hole 104, each slot 110 extending symmetrically on either side of the radius which extends through the centre line of the associated aperture 108 such that the fastening hole 104 is formed carried on decoupling flexures 112.

A countersunk spotface 113 is formed in at least one of the webs 109 (in the illustrated embodiment in all four of the webs 109) on the centre line thereof proximate to the inner radial edge of the flexplate 101 in which is mounted a SAW sensor which measures the strain in the web from which the torque transmitted through the flexplate 101 can be calculated. The or each spotface 113 extends substantially (half way) through the thickness of the web so that the SAW sensor lies in the plane of the neutral axis of the flexplate. The actual position of the neutral axis may be determined by simulating the application of bending stresses to the flexplate (including spotface), using finite element analysis.

Figure 5:
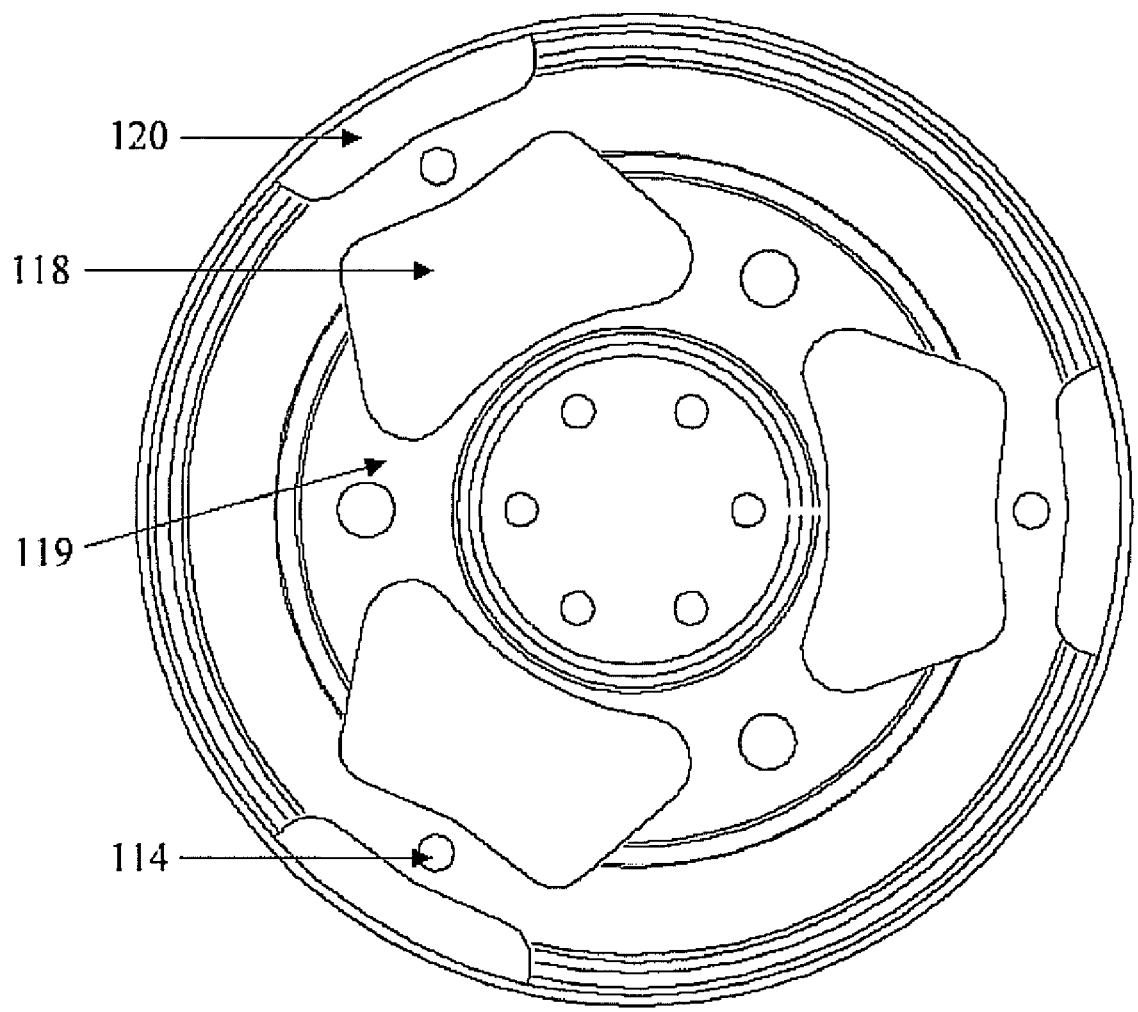
FIG. 5 is a front view of a second flexplate configuration embodying the invention.

FIG. 5 illustrates a second flexplate design which is similar to the first except that only three apertures 118 are provided which form three radial webs 119, three slots 120 and three outer fastening holes 114 being provided, one associated with each aperture 118. Accordingly, the flexplate of second embodiment has three-way rotational symmetry as compared with the four way rotational symmetry of the first embodiment.

Although the circumferential slots 110, 120 provide advantageous improvements to the measuring accuracy of the sensor, their presence is not critical to operation of the invention and significant improvements over conventional systems is still achieved if they are not present.

Figure 6:
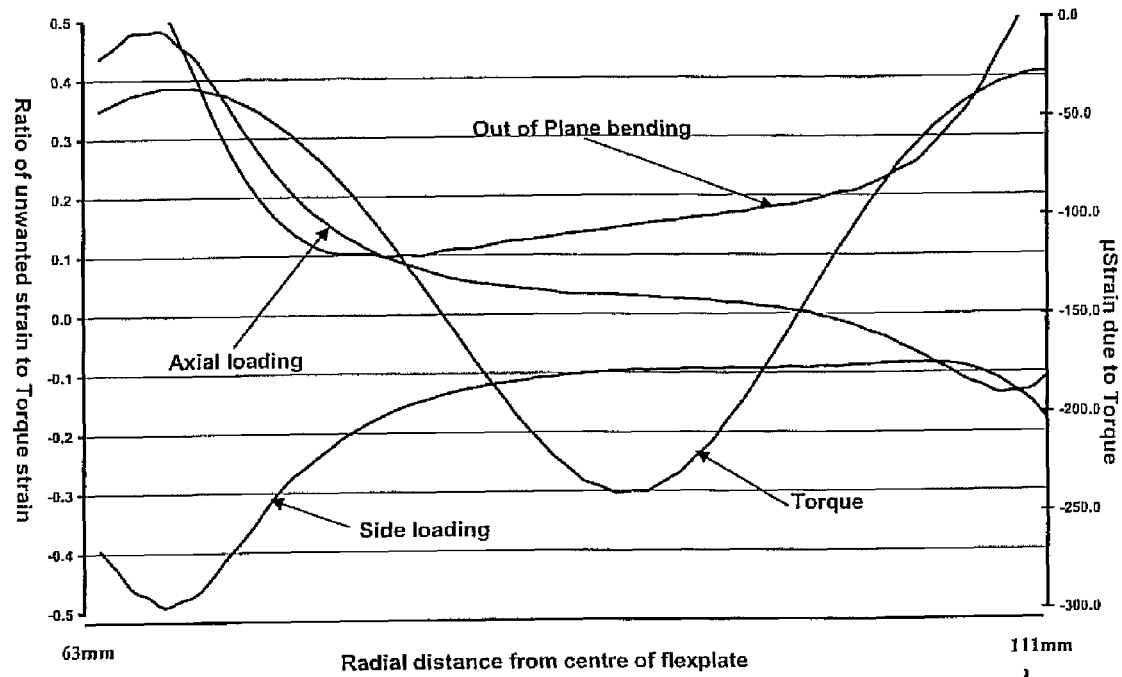
FIG. 6 is a graph showing results of a finite element analysis for a conventional flexplate.
Figure 7:
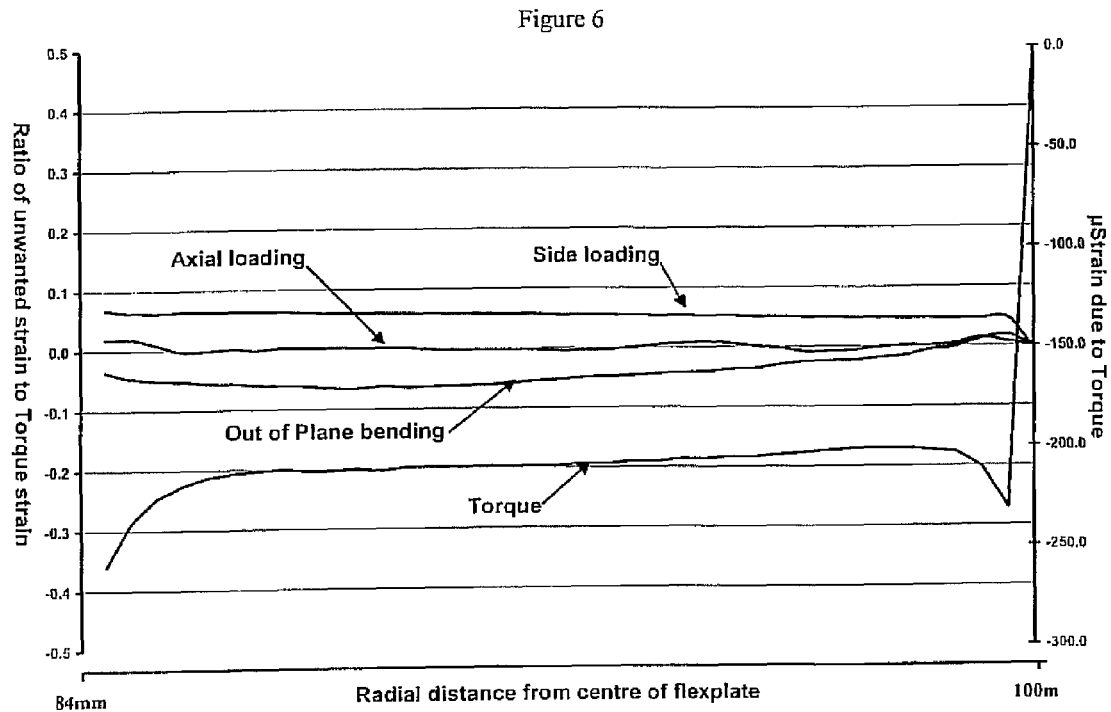
FIG. 7 is a graph showing results of corresponding finite element analysis for a flexplate according to the invention.

FIGS. 6 and 7 illustrate graphically the improvements in measurement sensitivity and accuracy afforded by the present invention. FIG. 6 shows results of a finite element analysis for a conventional flexplate, illustrating the distribution of shear strain (right hand axis) due to engine "Torque" along a radial line between 63 mm and 111 nm from the flexplate centre and the distribution of "unwanted shear strains due to axial and side loading and out-of-plane moments" (left hand axis) along the same radial line, but expressed as a decimal fraction of the "wanted shear strain due to engine Torque".

In comparison, FIG. 7 shows results of corresponding analysis for a flexplate according to the invention, illustrating the distribution of shear strain (right hand axis) due to engine "Torque" along a radial line between 84 mm and 100 mm from the flexplate centre, and the distribution of "unwanted shear strains due to axial and side loading and out of plane moments" (left hand axis) along the same radial line, again expressed as a decimal fraction of the "wanted shear strain due to Torque".

As can be seen from a comparison of these two graphs, the system of the invention greatly reduces the ratio of unwanted to wanted shear strain, and also affords the additional benefit of providing a much flatter region of both wanted and unwanted shear strain, making the placement of the sensor less critical compared with conventional systems.

What is claimed is:

1. A method of measuring torque in a shaft of a drive line including a disc coupling component having an axial surface, the method comprising the steps of:
   providing a SAW sensor having two active elements at different orientations such that principal strains, in two orthogonal directions, due to shear can be monitored using a single sensor;
   measuring the shear strain field on the axial surface with the SAW sensor; and
   calculating the torque in the shaft using said strain measurements.

2. The method according to claim 1, comprising the further step of mounting said strain sensor on a radially extending portion of said disc coupling component.

3. The method according to claim 1, wherein said strain sensor is mounted on a web portion of said disc coupling component through which torque between an input and an output of the drive line is transmitted.

4. The method according to claim 2, comprising the further step of mounting an additional strain sensor on a web portion of said disc coupling component such that unwanted strain signals may be removed by common mode subtraction.

5. The method according to claim 2, comprising mounting multiple sensor pairs configured to provide strain averaging.

6. The method according to claim 1, wherein said disc coupling component is a flexplate.

7. The method according to claim 1, wherein said disc coupling component includes a plurality of cutouts defining a plurality of spokes therebetween, the method including mounting the or each strain sensor on one of said spokes.

8. A torque measurement system to measure torque in a shaft of an engine drive train having a flexplate coupled to an engine crankshaft which extends through an engine block, comprising:
   a flexplate having radially extending webs and a countersunk recess formed in an axial surface of at least one of the webs;
   a sensor mounted in the countersunk recess such that the sensor lies proximate to the local neutral axis of the flexplate;
   a receiver stationarily coupled to the engine block for communicating wirelessly with said sensor; and
   said sensor measuring strain on the surface of the flexplate and transmitting the strain data to said receiver;
   wherein the strain data is used to calculate torque in the crankshaft of the engine.

9. The system according to claim 8, wherein the system includes one or more SAW sensors; wherein each sensor has two active elements at different orientations so that principal strain due to shear in two orthogonal directions can be monitored by a single sensor.

10. The system according to claim 8, further comprising:
    a configuration of multiple sensor pairs to provide strain averaging; and
    a rotating RF coupling electrically coupled to said sensors.

11. The system according to claim 8, wherein said sensor is mounted on a radially extending web portion of the flexplate through which torque between an input and an output of the drive line is transmitted.

12. The system according to claim 8, further comprising:
    at least one sensor fastened directly to the flexplate;
    a coupling electrically coupled to said at least one sensor;
    said receiver being fastened to the engine block so as to maintain a small but consistent axial gap to said coupling; and
    an additional sensor mounted on the flexplate;
    said at least one sensor and said additional sensor being mounted on web portions of the flexplate through which torque between an input and an output of the drive line is transmitted;
    wherein unwanted strain signals within the flexplate may be removed by common mode subtraction;
    wherein output signals from said at least one sensor and said additional sensor are transmitted wirelessly via RF to said receiver to calculate torque.

13. The system according to claim 12, wherein the system includes one or more SAW sensors; wherein each sensor has two active elements at different orientations so that principal strain due to shear in two orthogonal directions can be monitored by a single sensor.

14. The system according to claim 12, further comprising:
    a configuration of multiple sensor pairs to provide strain averaging; and
    a rotating RF coupling electrically coupled to said sensors.

15. The system according to claim 14, wherein said sensors are mounted on web portions formed between cutouts.

16. The system according to claim 15, further comprising:
    an engine drive train and engine block;
    a crankshaft extending through said engine block;
    a flexplate coupled to said crankshaft and having radially extending web portions formed between cutouts.

17. The system according to claim 8, further comprising:
    at least one shaft drivingly coupled to said flexplate for transmitting drive from the crankshaft;
    said flexplate having a plurality of circumferentially distributed axial through-apertures formed therein so as to define, between each pair of adjacent apertures, one of the radially extending web; and a plurality of circumferentially distributed axial fastening holes extending through said flexplate for drivingly attaching it to an output member;

wherein said sensor comprises a SAW strain sensor for measuring the shear strain field on said flexplate.

18. The system according to claim 17, further including a plurality of circumferentially extending slots formed in the flexplate between each fastening hole and the outer edge of the flexplate.

19. The system according to claim 18, wherein each fastening hole is located radially between one of said through apertures and one of said circumferentially extending slots.

20. The system according to claim 17, wherein each countersunk recess is countersunk to a depth such that the sensor lies substantially on the local neutral axis of the flexplate.

21. The system according to claim 17, wherein only three or only four through apertures are provided which correspondingly form three or four radial webs.

22. The system according to claim 17, wherein the or each strain sensor is a surface acoustic wave (SAW) device, which communicates in a non-contacting manner and which does not require active electronic components on the coupling component.

23. The system according to claim 17, wherein the or each sensor is symmetrically located on its associated web.

24. The system according to claim 23, wherein the or each sensor is located on the radial centre line of its associated web.

* * * * *

UNITED STATES PATENT AND TRADEMARK OFFICE
CERTIFICATE OF CORRECTION

PATENT NO. : 7,770,471 B2
APPLICATION NO. : 11/939242
DATED : August 10, 2010
INVENTOR(S) : Raymond David Lohr et al.

It is certified that error appears in the above-identified patent and that said Letters Patent is hereby corrected as shown below:

Column 2, line 29, after "45" delete the """ and insert the --°--;

Column 5, line 18, following "are" delete "her" and insert --further--; and

Column 7, line 16, following "111" delete "nm" and insert --mm--.

Signed and Sealed this

Fifth Day of October, 2010

David J. Kappos
*Director of the United States Patent and Trademark Office*